US012668742B2

(12) United States Patent
Moon et al.

(10) Patent No.: US 12,668,742 B2
(45) Date of Patent: Jun. 30, 2026

(54) BRANCHED WETTING AGENTS FOR ENHANCED TREATMENT OF DROUGHT FIELD CONDITIONS

(71) Applicant: Milliken & Company, Spartanburg, SC (US)

(72) Inventors: Nicholas G. Moon, Greer, SC (US); Jimmy M. Stokes, Duncan, SC (US); Richard Lawson, Greer, SC (US)

(73) Assignee: Milliken & Company, Spartanburg, SC (US)

( * ) Notice: Subject to any disclaimer, the term of this patent is extended or adjusted under 35 U.S.C. 154(b) by 861 days.

(21) Appl. No.: 17/962,584

(22) Filed: Oct. 10, 2022

(65) Prior Publication Data

US 2023/0127813 A1 Apr. 27, 2023

Related U.S. Application Data

(60) Provisional application No. 63/272,226, filed on Oct. 27, 2021.

(51) Int. Cl.
| | |
|---|---|
| *C09K 17/18* | (2006.01) |
| *B01J 20/26* | (2006.01) |
| *C08G 81/02* | (2006.01) |

(52) U.S. Cl.
CPC ............. *C09K 17/18* (2013.01); *B01J 20/264* (2013.01); *C08G 81/027* (2013.01)

(58) Field of Classification Search
None
See application file for complete search history.

(56) References Cited

U.S. PATENT DOCUMENTS

| | | | | |
|---|---|---|---|---|
| 5,356,553 | A | 10/1994 | Kono | |
| 5,921,021 | A | 7/1999 | Coates | |
| 6,851,219 | B2 | 2/2005 | Kostka | |
| 6,857,225 | B2 | 2/2005 | Petrea | |
| 6,948,276 | B2 * | 9/2005 | Petrea | C09K 17/18 |
| | | | | 47/58.1 SC |
| 7,399,730 | B2 | 7/2008 | Kostka | |
| 7,541,386 | B2 | 6/2009 | Kostka | |
| 11,891,346 | B2 * | 2/2024 | Moon | C08L 71/02 |

| | | | | |
|---|---|---|---|---|
| 2004/0261314 | A1 | 12/2004 | Petrea | |
| 2005/0028442 | A1 * | 2/2005 | Petrea | A01G 20/00 |
| | | | | 47/58.1 SC |
| 2008/0172937 | A1 | 7/2008 | Palmer | |
| 2021/0101846 | A1 * | 4/2021 | Moon | A01G 24/28 |
| 2023/0081187 | A1 * | 3/2023 | Moon | C08G 65/08 |
| | | | | 71/27 |
| 2023/0348784 | A1 * | 11/2023 | Moon | A01N 25/10 |

FOREIGN PATENT DOCUMENTS

| | | |
|---|---|---|
| IN | 201717037935 | 12/2017 |
| JP | S58105908 A | 6/1983 |
| WO | 2018005340 A1 | 1/2018 |

OTHER PUBLICATIONS

International Search Report and Written Opinion issued in App. No. PCT/US2022/046698, mailing date Mar. 24, 2023, 16 pages.
International Search Report and Written Opinion issued in App. No. PCT/US2022/046701, mailing date Jan. 20, 2023, 9 pages.
Hansen et al., "III. Independent Calculation of the Parameter omponents", Three Dimensional Solubility Parameter, vol. 39, No. 511, 1967, 5 pages.
Hansen, Charles M., "I. Solvents, Plasticizers, Polymers and Resins", Three Dimensional Solubility Parameter, vol. 39, No. 505, 1967, 14 pages.
Hansen, Charles M., "II and III. Dyes, Emulsifiers, Mutual Solubility and Compatibility, and Pigments", Three Dimensional Solubility Parameter, vol. 39, No. 511, 1967, 6 pages.
Hansen, Charles M., "The Three Dimensional Solubility Parameter and Solvent Diffusion Coefficient", Copenhagen, Danish Technical Press, 1967, 103 pages.

* cited by examiner

*Primary Examiner* — Joseph D Anthony
(74) *Attorney, Agent, or Firm* — Brenda D. Amidon

(57) ABSTRACT

This invention relates to multi-branched block copolymers suitable for use as wetting agents. The multi-branched block copolymers are comprised of an oxygen-containing polyfunctional base compound having at least 3 EO/PO block copolymer branches attached thereto. The improvement lies in: (a) the percent hydrophobic component, as defined as the weight % PO in the molecule, being present in an amount from 40% to 60% by weight and in (b) the molecular weight per branch (or arm), as defined as the total number average molecular weight of the polymer divided by the functionality of the base being greater than 1700 gmol$^{-}$$_1$arm$^{-1}$. It was surprisingly discovered that this combination of intermediate hydrophobicity and high molecular weight give superior drought tolerance for plants treated therewith.

10 Claims, No Drawings

BRANCHED WETTING AGENTS FOR ENHANCED TREATMENT OF DROUGHT FIELD CONDITIONS

CROSS REFERENCE TO RELATED APPLICATIONS

This application claims priority to U.S. Provisional Patent Application No. 63/272,226, entitled "Improved Branched Wetting Agents For Enhanced Treatment of Drought Field Conditions," which was filed on Oct. 27, 2021, and is entirely incorporated by reference herein.

TECHNICAL FIELD

This invention relates to multi-branched block copolymers suitable for use as wetting agents. The multi-branched block copolymers are comprised of an oxygen-containing polyfunctional base compound having at least 3 EO/PO block copolymer branches attached thereto. The improvement lies in: (a) the percent hydrophobic component, as defined as the weight % PO in the molecule, being present in an amount from 40% to 60% by weight and in (b) the molecular weight per branch (or arm), as defined as the total number average molecular weight of the polymer divided by the functionality of the base being greater than 1700 $gmol^{-1}arm^{-1}$. It was surprisingly discovered that this combination of intermediate hydrophobicity and high molecular weight give superior drought tolerance for plants treated therewith.

BACKGROUND

Wetting agents are used in managed turf environments to prevent dry spot formation and reduce water usage. These wetting agents, also known as soil surfactants, are typically sold as high activity (70%+) individual components or blends and diluted into water before spraying onto the grass. Many of these soil surfactant products are linear block copolymers of ethylene oxide (EO) and propylene oxide (PO), while others are branched molecules such as those patented by Applicant. However, there is an opportunity to further improve wetting agent performance, particularly over long application time frames and under drought conditions, where improved turf quality using less water is valuable. Under these conditions, the soil moisture content and surfactant efficiency can drop, leading to localized dry spot (LDS) formation. Wetting agents that improve the soil moisture content under the same watering conditions will give improved turf appearance and prevent LDS formation. The present invention addresses the shortcomings of prior art wetting agents and offers additional benefits over other types of soil surfactants. Therefore, the multi-branched block copolymers of the present invention containing 40% to 60% PO and a molecular weight per branch greater than 1700 $gmol^{-1}arm^{-1}$ represents a useful advancement over the prior art and further fulfill a need that prevents dry spot formation and loss of turf and/or plants. It was surprisingly found that multi-branched alkoxylated block copolymers having specific blends of EO and PO groups combined with modified end groups having hydrophobic moieties attached thereto can provide these aforementioned benefits to soil.

BRIEF SUMMARY

In one aspect, the invention relates to a multi-branched block copolymer comprising:

(a) A polyfunctional base selected from the group consisting of a polyol, a polycarboxylic acid, and a lactone, and (b) At least three branches attached to the polyfunctional base, wherein:
  (i) each branch comprises of a combination of ethylene oxide and propylene oxide,
  (ii) each branch independently comprises an amount of propylene oxide in the range from 40% to 60% by weight;
  (iii) the molecular weight per branch (or arm), as defined as the total number average molecular weight of the polymer divided by the functionality of the base, is greater than 1700 $gmol^{-1}arm^{-1}$; and (iv) each branch is terminated with either hydrogen or a hydrophobic end group.

In a further aspect, the invention relates to a multi-branched block copolymer having the following formula:

$$-R_1-(O-(CH_2CHR_2O)_x(CH_2CH_2O)_yCOR_3)_z$$

wherein:

$R_1$ is a multi-functional oxygen-containing polyol with at least 3 oxygen-containing reactive sites;

$R_2$ is H, $CH_3$, $CH_2CH_3$, phenyl, or $CH_2OR_a$ wherein $R_a$ is any alkyl, aryl or siloxane group;

$R_3$ is either a hydrophobic end-group which contains a carbon chain with 4 or more carbons, preferably 4 to 20 carbons, or H, with at least one of the groups being the hydrophobic end-group;

x is an integer from 1 to 200, preferably 20 to 80;

y is an integer from 1 to 250, preferably 100 to 250; and z is an integer from 3 to 10.

In yet another aspect, the invention relates to a method of improving drought tolerance for plants comprising the following steps:

(a) Providing the multi-branched block copolymer as described herein, (b) Applying the multi-branched block copolymer to a soil-containing turf environment, and (c) Allowing the multi-branched block copolymer to penetrate the soil-containing turf environment.

DETAILED DESCRIPTION

The present invention relates to an improved range of compositions of multi-branched wetting agents. Generally, the wetting agents are multi-branched block copolymers. The polyfunctional base is an oxygen-containing compound with at least 3 EO/PO block copolymer branches attached thereto. The base can be selected from a polyol, a polycarboxylic acid, and a lactone. A full description of the molecules can be found in U.S. Pat. No. 6,948,276 to Petrea et al. It has unexpectedly been discovered that a subset of the multi-branched polymers provides improved performance under drought conditions. This invention claims a subset wherein the hydrophobic component, as defined as the weight % PO in the molecule, is in the range from 40% to 60%. Additionally, a subset is also claimed wherein the molecular weight per branch (or arm) of the molecule, as defined as the total number average molecular weight of the polymer divided by the functionality of the base, is greater than 1700 $gmol^{-1}arm^{-1}$. A subset is also claimed wherein the molecular weight per branch (or arm) of the molecule, as defined as the total number average molecular weight of the polymer divided by the functionality of the base, is in the range from 1700 $gmol^{-1}arm^{-1}$ to 3000 $gmol^{-1}arm^{-1}$. Typically, the prior art has taught that components with higher hydrophobicity, usually greater that 70%, give superior wetting performance. However, it has been surprisingly discovered that the combination of intermediate hydrophobicity and high molecular weight give superior drought tolerance as evidenced through a testing via field trial.

In addition to the above components, the formula can contain additional surfactants, inert ingredients, solvents, fertilizers, pesticides, biostimulants or other components designed to improve the plant health.

The wetting agent is like the polymers described in U.S. Pat. No. 6,948,276 to Petrea et al. The alkoxylate component is selected from ethylene oxide ("EO"), propylene oxide ("PO"), butylene oxide ("BO"), and combinations thereof. However, a key difference is the balance between EO and PO and surfactant molecular weight. The polymer of the present invention has between 3 and 10 branches (or arms). Typical alkoxylates designed as surfactants for hydrophobic sand feature between 50% and 80% PO, with 70% and 80% PO being most preferred. The alkoxylate in this invention features from 40% to 60% PO, with 50% PO being most preferred. The EO and PO can be found in one or more blocks, a random copolymer, or a mixture of the two. Additionally, the molecular weight per arm of the polymer is greater than or equal to 1700 g/mol, with 2000 g/mol being most preferred.

In another aspect of the invention, the multi-branched polyol compound is comprised of two to ten polymer-containing branches, or even two to eight polymer-containing branches, or even four to six polymer-containing branches, or even six polymer-containing branches.

In another aspect of the invention, at least one oxygen-containing polyfunctional base compound further contains at least one polyalkyleneoxy chain. At least one polyalkyleneoxy chain may be a polymeric epoxide. The polymeric epoxide is selected from the group consisting of polyethylene oxides; polypropylene oxides; polybutylene oxides; copolymers of polyethylene oxides, polypropylene oxides and polybutylene oxides; and other copolymers including block copolymers. All or part of the polymer may also come from other polyethers such as polyoxetanes or polytetrahydrofurans. In another aspect of the invention, a majority of the polymeric substituent is polyethylene oxide, polypropylene oxide and/or polybutylene oxide.

The multi-branched wetting agent includes at least one multi-branched oxygen or nitrogen-containing polyfunctional compound. Such a polyfunctional compound may be a polyol, a polycarboxylic acid, a lactone (the ring structure of which will open upon reaction to provide the necessary reactive sites for surfactant addition thereto), an amino acid, a polyamine, or mixtures thereof, wherein the moieties include reactive end groups for reaction with surfactant-like groups to form the desired branches therein. In such a base compound, the oxygen-containing functionalities (oxygen alone, or as part of a carboxylic acid group) provide the reactive sites and thus act as linking groups between the base compound and the surfactant-like branches. Alternatively, in cases where both oxygen-containing functionalities and nitrogen-containing functionalities are present, such as in amino acids, both functionalities may provide reactive sites which act as linking groups between the base compound and the surfactant-like branches.

Thus, particular classes of polyols suitable for this purpose include, without limitation, tri- to octa-hydric alcohols such as pentaerythritol, diglycerol, α-methylglucoside, sorbitol, xylitol, mannitol, erythritol, dipentaerythritol, arabitol, glucose, sucrose, maltose, fructose, mannose, saccharose, galactose, leucrose, and other alditol or sugar molecules or polysaccharides; polybutadiene polyols; castor oil-derived polyols; hydroxyalkyl methacrylate copolymers; hydroxyalkyl acrylate polymers; polyvinyl alcohols; glycerine; 1,1,1-trimethylolpropane; 1,1,1-trimethylolethane; 1,2,6-hexanetriol; butanetriol; and mixtures thereof. Potentially preferred base compounds are the alditol types, particularly sorbitol and sucrose. The polyol can also be a blend of two or more of the above components.

Suitable polycarboxylic acids include, without limitation, tartaric acid; citric acid; ascorbic acid; 2-phosphono-1,2,4-butane tricarboxylic acid; glucuronic acid; ethylenediaminetetraacetic acid; gluconic acid; cyclohexane hexacarboxylic acid; mellitic acid; saccharic acid; mucic acid; diethylenetriamine pentaacetic acid; glucoheptonic acid; lactobionic acid; 3,3',4,4'-benzophenone tetracarboxylic acid; amino propyl trimethoxysilane; aminopropyltriethoxysilane; 3-glycidoxypropyltrimethoxy silane; 3-glycidoxypropyltriethoxysilane; 3-(triethoxysilyl)propyl isocyanate; 3-(trimethoxysilyl)propyl isocyanate; diaminopropane-N,N,N',N'-tetraacetic acid; aconitic acid; isocitric acid; 1,2,3,4-butanetetracarboxylic acid; nitrilotriacetic acid; tricarballylic acid; N-(phosphonomethyl)iminodiacetic acid; 3-[[tris (hydroxymethyl)methyl]amino]-1-propanesulfonic acid; 2-[[tris(hydroxymethyl)methyl]amino]-1-ethanesulfonic acid; 3-[bis(2-hydroxyethyl)amino]-2-hydroxy-1-propanesulfonic acid; 3-[N-trishydroxymethylmethylamino]-2-hydroxypropanesulfonic acid; N-tris[hydroxymethyl]methyl-4-aminobutanesulfonic acid; 3-aminoadipic acid; 1,3-diamino-2-hydroxypropane-N,N,N',N'-tetraacetic acid; triethylenetetraaminehexaacetic acid; β-carboxyaspartic acid; α-hydroxymethylaspartic acid; tricine; 1,2,3,4-cyclopentanetetracar-boxylic acid; 6-phosphogluconic acid; and mixtures thereof.

Suitable lactones include, without limitation, glucoheptonic lactone and glucooctanoic-.gamma.-lactone. Suitable amino acids include, without limitation, aspartic acid, α-glutamic acid, and β-glutamic acid.

Suitable polyamines include but are not limited to ethylenediamine, diethylene triamine, triethylamine tetramine, pentaethylene hexamine, poly(ethylene imine), and polyvinylamine.

Unique to these molecules is the ability to improve the health of turfgrass grown on hydrophobic soil under low water conditions relative to other similar products commonly used today. This superior performance is assessed as improved turf visual quality and increased volumetric soil moisture content.

These molecules may additionally be blended with one or more components such as another compound that actively lowers the surface tension of water such as a phenol ethoxylate, an alcohol ethoxylate, an alkyl sulfate, and alkyl phosphate, a linear ethylene oxide/propylene oxide block copolymer such as L62, polyols, poly(ethylene glycol), propylene carbonate, glycerin carbonate, or water; another unfunctionalized branched block copolymers like those discussed in U.S. Pat. No. 6,948,276 B2, an alkylpolyglycoside, or any other compound known in the art to function as a surfactant; an inactive diluent such as propylene glycol, dipropylene glycol, propylene carbonate, dimethyl sulfoxide, glycerin carbonate, alkoxylated polyols; a fertilizer; a pesticide; a biostimulant; and a colorant.

One useful feature of wetting agents in turf is to improve turf health and reduce localized dry spots under drought or deficit irrigation conditions. More generally, branched wetting agents such as L62, 25R2, alkyl capped EO/PO block copolymers, and hydrophobic multi-branched EO/PO block copolymers have been used to treat localized dry spots.

Typically, it is thought that more hydrophobic wetting agents are more effective. This is surprising, as many of the products sold as wetting agents today have hydrophobicity (as measured by wt % PO) in the range of 70-90%. We discovered that a subset of branched wetting agents that have a combination of a high molecular weight and intermediate hydrophobicities give particularly good resistance to dry spot formation during long periods of deficit irrigation. The performance in a field trial (Example 1) shows superior performance to other branched wetting agents that have been produced and sold by Milliken. Systematic study suggests that both structural features (intermediate hydrophobicity and high molecular weight) are required for ideal performance. Without being bound to any particular theory, it is believed that the high molecular weight facilitates self-assembly and surface activity of the polymeric component, improving surfactant performance relative to analogs of similar hydrophobicity but lower molecular weight. This enables the surfactant product to take advantage of the lower hydrophobicity to locally absorb moisture from the atmosphere, improving plant root health. The higher molecular weight also likely improves the longevity, presumably, but without being bound to any particular theory, because microbial degradation is slowed due to the higher average molecular weight.

EXAMPLES

The following Examples are provided for illustration purposes and should not be considered as limiting the scope of the invention. These Examples are intended to demonstrate the moisture retention and resistance to dry spot formation properties of the multi-branched block copolymers of the present invention.

Examples 1A to 1 D: Branched Wetter Preparation for Field Trial

The branched wetting agent compositions were synthesized using methods described in U.S. Pat. No. 6,948,276. The samples were blended with 5 wt % Syn Lube 6485, an alcohol ethoxylate (commercially available from Milliken & Company of Spartanburg, SC) to improve initial infiltration into the soil. Compositions are shown in Table 1.

Example 1A

Propoxylated glycerin (MW=556) was added into a steel autoclave (350 g) followed by KOH flake (3.1 g). The autoclave was sealed and heated to 230° F. and stripped under vacuum until the % water was less than 0.05%. At this point, the reactor was heated to 280° F. and 472 g of propylene oxide (PO) was added followed by 751 g ethylene oxide (EO). When the reaction was complete, the mixture was vacuum stripped to remove residual oxide and neutralized with acetic acid.

Example 1B

Propoxylated glycerin (MW=4000) was added into a steel autoclave (1000 g) followed by KOH flake (3.0 g). The autoclave was sealed and heated to 230° F. and stripped under vacuum until the % water was less than 0.05%. At this point, the reactor was heated to 280° F. and 102 g of propylene oxide (PO) was added followed by 418 g ethylene oxide (EO). When the reaction was complete, the mixture was vacuum stripped to remove residual oxide and neutralized with acetic acid.

Example 1C

Propoxylated sorbitol (MW=4352) was added into a steel autoclave (1000 g) followed by KOH flake (2.9 g). The autoclave was sealed and heated to 230° F. and stripped under vacuum until the % water was less than 0.05%. At this point, the reactor was heated to 280° F. and 66 g of propylene oxide (PO) was added followed by 404 g ethylene oxide (EO). When the reaction was complete, the mixture was vacuum stripped to remove residual oxide and neutralized with acetic acid.

Example 1D

Propoxylated sorbitol (MW=4352) was added into a steel autoclave (600 g) followed by KOH flake (3.3 g). The autoclave was sealed and heated to 230° F. and stripped under vacuum until the % water was less than 0.05%. At this point, the reactor was heated to 280° F. and 248 g of propylene oxide (PO) was added followed by 816 g ethylene oxide (EO). When the reaction was complete, the mixture was vacuum stripped to remove residual oxide and neutralized with acetic acid.

TABLE 1

| Composition Summary of Example 1 | | | |
| --- | --- | --- | --- |
| Example | % PO | MW/arm | # of Arms |
| 1A | 50 | 800 | 3 |
| 1B | 70 | 2000 | 3 |
| 1C | 70 | 1000 | 6 |
| 1D | 40 | 2000 | 6 |

The wetting agents from Examples 1A to 1D were then prepared as formulation samples as shown in Table 2.

TABLE 2

| Formulation Samples | |
| --- | --- |
| Component | Wt % |
| Example 2A | |
| Example 1A | 95 |
| Syn Lube 6485 | 5 |
| Example 2B | |
| Example 1B | 95 |
| Syn Lube 6485 | 5 |
| Example 2C | |
| Example 1C | 95 |
| Syn Lube 6485 | 5 |
| Example 2D | |
| Example 1D | 95 |
| Syn Lube 6485 | 5 |

Each of the samples from Table 2 were evaluated for soil moisture retention in field trials as described herein.

General Procedure 1: Field Trial Data

Field trial work was performed at a university research green in the southern United States known to have significant drought pressure. The formulations from Table 2 were used for the field trial work. L62 and 25R2 (commercially available from BASF) and Revolution (soil surfactants commercially available from Aquatrols) were used as comparative examples and industry standard controls for this study. All three of the commercial products are hydrophobic (>70% PO) relative to the inventive products. Their typical molecular weight/arm is also about 1200 g/mol. Visual rating data is provided in Table 3. The products were sprayed on the field on Jul. 14, 2020, at a rate of 8 oz/1000 sq. ft. Samples were sprayed on a 2'×2' square. Each sample was repeated in triplicate on a randomized position within the field except for the untreated control which was repeated six times. The samples were irrigated using best practices for 2 months then dried down to form localized dry spots. Drone images were taken on Sep. 16, 2020 and Sep. 30, 2020. The turf was rated on a 1-3 visual scale, with 3 being no dry spots, 2 being intermediate dry-spot coverage, and 1 being near total dry spot coverage. Each plot was independently rated by 4 individuals, and the results were averaged. Additionally, soil moisture measurements were taken with a TDR probe at a 3" depth on Sep. 2, 2020 and Sep. 16, 2020.

TABLE 3

Visual ratings at two time points

| Sample | Visual Rating Sep. 16, 2020 | Visual Rating Sep. 30, 2020 |
|---|---|---|
| Example 2A | 0.90 | 1.33 |
| Example 2B | 2.75 | 2.42 |
| Example 2C | 2.42 | 2.33 |
| Example 2D | 2.83 | 2.92 |
| L62 | 2.25 | 1.67 |
| 25R2 | 2.50 | 2.17 |
| Revolution | 2.42 | 1.83 |
| Control | 2.25 | 1.83 |

The rating data in Table 3 clearly shows the superior performance achieved by Example 2D which has intermediate hydrophobicity (50% PO) and high molecular weight (12000 g/mol). The surprising result is superior visual appearance of the green, when compared directly against industry standard controls, as well as other branched products with either high or low hydrophobicities.

The above examples clearly show the improved visual rating of Example 2D, which has a high molecular weight and intermediate hydrophobicity over other branched block copolymers or industry leading competitors. Especially at the 9/30 timepoint, Example 2D has a nearly perfect rating, while Revolution is indistinguishable from the control. The other more hydrophobic examples (2B, 2C, L62, 25R2) also show lower visual quality. Example 2A illustrates the importance of molecular weight. While Example 2A also has 50% PO, its molecular weight is much lower, and the visual rating is much lower than Example 2D.

Thus, the present invention further includes a soil composition comprising the multi-branched block copolymer as described herein and a soil mixture.

The moisture volumetric water content (VWC) was also rated at 3" depth using a TDR probe on the two September dates. Average soil moisture for each example is provided in Table 4 below.

TABLE 4

Volumetric Water Content at 2 rating points.

| Sample | VWC Sep. 2, 2020 (%) | VWC Sep. 16, 2020 (%) |
|---|---|---|
| Example 2A | 26.47 | 12.90 |
| Example 2B | 27.28 | 16.66 |
| Example 2C | 27.86 | 19.44 |
| Example 2D | 29.98 | 22.08 |
| L62 | 28.82 | 18.03 |
| 25R2 | 29.78 | 18.02 |
| Revolution | 29.54 | 17.61 |
| Control | 26.91 | 15.31 |

At the Sep. 2, 2020 time point, the effects of the deficit irrigation had not taken full effect. While Example 2D, which has intermediate hydrophobicity and high molecular weight, maintains high moisture, other competitive examples show similar performance. By Sep. 16, 2020, the dry spot pressure had significantly increased. In this case, Example 2D has a VWC that is at least 3% higher than other examples. This higher water content corresponds well with improved visual appearance. The VWC is almost 5% higher than the industry standard product Revolution by Aquatrols, and almost 7% higher than the untreated control.

General Procedure 2: Sand Infiltration Time

Artificial hydrophobic sand was created by mixing golf-course grade sand with 8% dried peat moss. Three grams of the sand:peat mix was loaded into a straw plugged on one end with cotton. The straw was propped up and the curved end held at roughly a 45° angle.

Two grams of a 2.3% solution of the multi-branched wetting agent was added to the straw. The time it took for the liquid front to reach the cotton at the end was recorded. Each result was repeated in triplicate and the average was reported. Test results are provided in Table 5.

TABLE 5

Straw Infiltration Times

| Sample | Composition | Infiltration Time (sec) |
|---|---|---|
| Example 1A | Glycerin 2400 50:50 Block | 534 |
| Example 1B | Glycerin 6000 70:30 Block | 241 |
| Example 1C | Sorbitol 6400 70:30 Block | 465 |
| Example 1D | Sorbitol 12000 50:50 Block | 653 |
| Comparative Example 1A | L62 | 332 |

The straw infiltration time experiment is a commonly used method to show the effectiveness of a wetting agent. It is typically thought that lower infiltration times translate to superior wetting agent efficiency. As is expected, samples with higher hydrophobicity such as Examples 1B and 1C show lower infiltration times. L62, a common surfactant used as a wetting agent, also shows lower infiltration time. L62 is roughly 80% hydrophobic, which is consistent with this observation. However, the visual rating performance of Example 1D is superior to the other examples, demonstrating the surprising nature of the discovery.

All percentages and ratios are calculated by weight unless otherwise indicated. All percentages and ratios are calculated based on the total composition unless otherwise indicated.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

We claim:

1. A wetting agent composition comprising:
   A. a multi-branched block copolymer comprising:

(a) A polyfunctional base selected from the group consisting of a polyol, a polycarboxylic acid, and a lactone, and
   (b) At least three branches attached to the polyfunctional base, wherein:
       (i) each branch consists of ethylene oxide and propylene oxide,
       (ii) each branch independently comprises an amount of propylene oxide in the range from 40% to 60% by weight based on total alkoxylate content of each branch;
       (iii) the molecular weight per branch (or arm), as defined as the total number average molecular weight of the polymer divided by the functionality of the base, is in the range from 1700 $gmol^{-1}arm^{-1}$ to 3000 $gmol^{-1}arm^{-1}$; and
       (iv) each branch is terminated with either hydrogen or a hydrophobic end-group; and
   B. an alcohol ethoxylate.

2. The wetting agent composition of claim 1, wherein the amount of propylene oxide is 50%.

3. The wetting agent composition of claim 1, wherein polyols are selected from the group consisting of tri-to octa-hydritic alcohols, glucose, sucrose, maltose, fructose, mannose, galactose, leucrose, and other alditol or sugar molecules.

4. The wetting agent composition of claim 3, wherein tri-to octa-hydritic alcohols include pentaerythritol, glycerol, diglycerol, a-methylglucoside, sorbitol, xylitol, mannitol, erythritol, dipentaerythritol, and arabitol.

5. The wetting agent composition of claim 1 having the following formula:

$$R_1 — (O—(CH_2CHR_2O)_x(CH_2CH_2O)_yCOR_3)_z$$

wherein:
$R_1$ is a multi-functional oxygen-containing polyol with at least 3 oxygen-containing reactive sites;
$R_2$ is $CH_3$;
$R_3$ is either a hydrophobic end-group which contains a carbon chain with 4 or more carbons or H, with at least one of the groups being the hydrophobic end-group;
x is an integer from 1 to 200;
y is an integer from 1 to 250; and
z is an integer from 3 to 10.

6. The wetting agent composition of claim 5, wherein $R_3$ is a hydrophobic end group containing from 4 to 20 carbons.

7. The wetting agent composition of claim 5, wherein x is an integer from 20 to 80.

8. The wetting agent composition of claim 5, wherein y is an integer from 100 to 250.

9. A soil composition comprising the wetting agent composition of claim 1 and a soil mixture.

10. A method of improving drought tolerance for plants comprising the following steps:
   (a) Providing the wetting agent composition of claim 1,
   (b) Applying the wetting agent composition to a soil-containing turf environment, and
   (c) Allowing the wetting agent composition to penetrate the soil-containing turf environment.

* * * * *